United States Patent [19]

Tamari

[11] Patent Number: 5,148,315
[45] Date of Patent: Sep. 15, 1992

[54] METHOD AND MEANS TO CANCEL DIFFRACTION EFFECTS FROM RADIATION FIELDS

[75] Inventor: Vladimir F. Tamari, 4-2-8-C26, Komazawa, Setagayaku, Tokyo, Japan, 154

[73] Assignee: Vladimir F. Tamari, Tokyo, Japan

[21] Appl. No.: 208,400

[22] Filed: Jun. 17, 1988

Related U.S. Application Data

[63] Continuation-in-part of Ser. No. 7,971, Jan. 28, 1987, abandoned.

[51] Int. Cl.$^5$ .............................................. G02B 27/42
[52] U.S. Cl. .................................... 359/558; 343/912; 359/562; 359/868
[58] Field of Search ....................... 350/162.11, 162.12, 350/413, 435; 359/558, 562, 868, 869, 708; 343/753, 755, 912

[56] References Cited

U.S. PATENT DOCUMENTS 3,732,363  5/1973  Glenn, Jr. .
3,770,340  11/1973  Cronin et al. .

OTHER PUBLICATIONS

Durnin et al., "Diffraction-Free Beams," *Physical Review Letters*, vol. 58, No. 15, Apr. 13, 1987, pp. 1499 to 1501.
Frank Crawford, "Elementary Derivation of the Wake Pattern of a Boat," *American Journal of Physics*, vol. 52, No. 9, Sep. 1984, pp. 782 to 785.
J. Durnin, "Exact Solutions for Nondiffracting Beams. I. The Scalar Theory," *Journal of the Optical Society of America*, vol. 4, No. 4, Apr. 1987, pp. 651 to 654.
Hecht et al., *Optics*, Addison-Wesley Co., Reading, Mass., 1974, p. 465, FIGS. 14.6(a) and (b).

*Primary Examiner*—Bruce Y. Arnold
*Assistant Examiner*—Martin Lerner
*Attorney, Agent, or Firm*—Oldham, Oldham & Wilson Co.

[57] ABSTRACT

A method for cancelling or minimizing the effects of diffraction in wave fields in a wide range of imaging instruments such as telescopes, radar, cameras, ultrasound imaging devices and others, or from laser beams, is described, based on the premise that diffraction is associated with the bending of the energy streamlines of a field, so that such cancellation or minimization of diffraction effects is accomplished by shortening the optical path length normal to the aperture systematically by a function D(x) which has the general form of a superellipse with a minor axis of L and a major axis of A/2, where L is the wave-length of the wave-field, and A is the width or diameter of the aperture, so that the bent streamlines of energy flow near the aperture edge are straightened and the resulting diffraction standing wave pattern is cancelled.

5 Claims, 2 Drawing Sheets

METHOD AND MEANS TO CANCEL DIFFRACTION EFFECTS FROM RADIATION FIELDS

This application is a continuation-in-part of Ser. No. 07/007,971 filed Jan. 28, 1987, and now abandoned.

TECHNICAL FIELD

This invention describes a method to eliminate diffraction effects whenever electromagnetic radiation, acoustical waves, electron beams and other wave or fluid flow fields are encountered, providing "diffraction-unlimited" resolving capability in a wide range of imaging instruments, and preventing the divergence of beams emitted by lasers, radar or sonar systems. The principle of cancellation of diffraction or de-diffraction (DD) comprising this invention can thus be applied to such various instruments as optical and radio telescopes, cameras, all types of scanning microscopes, radar and microwave antennas, sonar and ultrasound imaging devices, lasers and particle beams, integrated optical devices, optical fibre systems, and whenever a field of any kind experiences the distorting effects of diffraction.

BACKGROUND ART

Diffraction is a physical phenomena universally observed whenever a field of propagating energy impinges on an obstacle, causing the field to change the direction of its flow. In the case of light, for example, parallel rays reaching a mirror or lens appear to bend at the rim, making it impossible to focus the rays into a true point. A star, for example, would be imaged as a disc surrounded by rings setting the so-called "diffraction-limits" to the resolving capability of imaging instruments. This is given by $$R = 1.22 \, L/A \quad (1)$$

for a lens or reflector of diameter A focusing radiation of wavelength L. In lasers and sonar beams alike, diffraction causes the spreading of the output field, making it lose its concentration as the distance from the source increases.

Although diffraction is thus a 'natural phenomena' like gravitation, it is the object of this invention to show that diffraction effects can indeed be prevented from forming, just as gravity, by analogy, is 'cancelled' in satellites, where the centrifugal force is equal to and opposite to the gravitational force, resulting in zero gravity. That diffraction-free fields are indeed possible has been shown, albeit in a limited way, by recently published theoretical and experimental results.

Toraldo di Francia invented so-called superresolving filters which use an aperture divided into annular regions, and succeed in giving a very sharp, but extremely faint central maximum. However a large amount of new diffraction is introduced in the side-lobes of the image function, making such filters of no practical value. These are described in "Reappraisal of Arrays of Concentric Annuli as Superresolving Filters", *Journal of the Optical Society of America*, Vol.72, pp.1287-1291 (1982). More recently J. Durnin, writing in *The Journal of the Optical Society of America (A)*, Vol.4, No.4 April 1987, "Exact solutions for non-diffracting beams. I. The scalar theory", pp. 651-654 has shown theoretically how the wave equation can yield diffraction-free modes. Experimental demonstartion of these beams was given by J. Durnin et al in *Physical Review Letters*, "Diffraction-Free Beams", Apr. 13, 1987 Vol.58 No.15 pp.1499-1501. Here the aperture is limited to a single thin ring, making the resulting beam very faint. Without doubt, however, as in the super-resolving filters, special methods implemented near the aperture rim have indeed succeeded in cancelling diffraction effects. V. Tamari, writing in *Optoelectronics* (Mita Press, Tokyo, Japan) Vol.2, No.1, June 1987, "The Cancellation of Diffraction In Wave Fields" pp.59-81 has described a totally different method where the full area of the aperture is utilized, but with a phase change mostly near the rim, giving a bright yet diffraction-free (DD) field.

In all these studies it was shown theoretically and experimentally that diffraction effects could be cancelled by implementing various methods at the aperture-$(x,y)$-plane. As will be shown below, the current proposal is to introduce a phase change $D(x,y)$ to the field either at the open aperture (such as that of a laser) or to the focusing optics of a lens or reflector, giving diffraction-unlimited focused images or diffraction-free beams. These and other objects of the invention will be made more apparent as the specification proceeds.

BRIEF DESCRIPTION OF DRAWINGS

Attention is now directed to the accompanying drawings, where.

DISCLOSURE OF THE INVENTION

Figure 1:
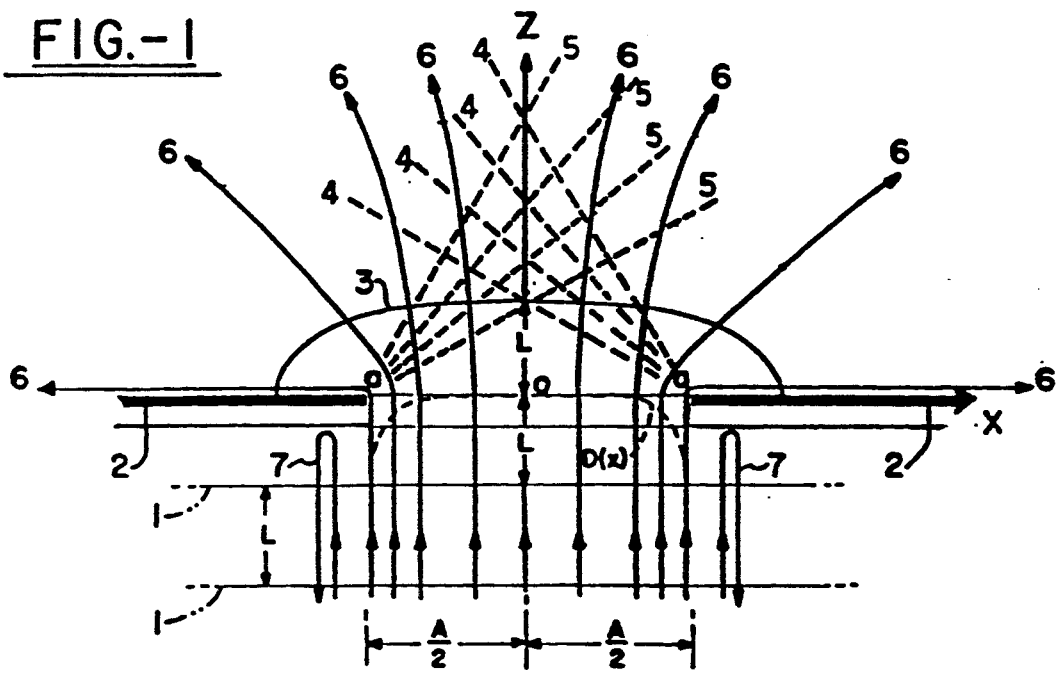
FIG. 1 is a diagram of the streamlines, wavefront and intensity maxima of a diffracted field.
Figure 2:
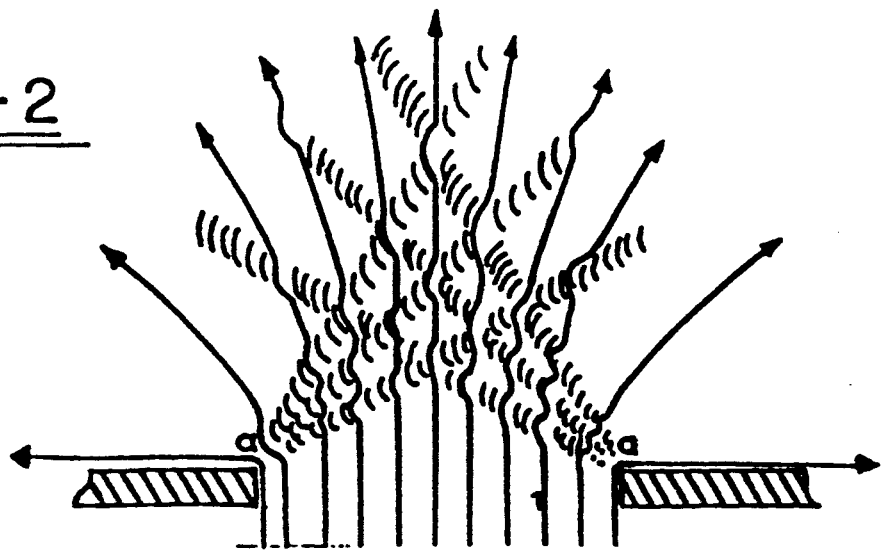
FIG. 2 Shows the streamlines and wake patterns of fluid flowing through a gate.

The possibility that the cancellation of diffraction (DD) is a practical matter follows from an analysis of the physical causes of diffraction: Why does a homogeneous wave-field with a uniform intensity function suddenly exhibit a complex pattern of intensity maxima and minima as soon as it passes by an obstacle such as the edge of a lens? In answering this question we shall refer to the strong resemblance of an electromagnetic field to fluid flow. Born and Wolf wrote in *Principles of Optics* (Pergamon Press, 1975, p.9) that "a description of propagation of light in terms of a hydrodynamical model is often helpful . . . in connection with scalar diffraction fields, as it gives a picture of energy transport in a simple and graphical manner". Specifically, the Equation of Continuity in fluid mechanics has its exact opposite in Maxwell's equations. In fluid mechanics energy flows along streamlines, while in electromagnetic theory energy flow is defined by the Poynting vector along (ExB). This gives the theoretical justification for describing diffraction as a wake pattern of intensity maxima caused by the bending of the energy streamlines near the obstacle's edge. Indeed this picture emerges from one of the very few cases where diffraction problems have been rigorously solved. Born and Wolf (pp.576–577 of the above book) have published important studies based on Sommerfeld's famous solution, showing the exact behavior of a field as it passes a half-plane obstacle: First, as in FIG. 11.14, its energy streamlines bend, spreading energy into the shadow regions. This casues the lines of equal phase (the wavefronts, FIG. 11.13) to bend into semi-elliptical patterns. Simultaneously (FIG. 11.12) a pattern of intensity maxima is formed, radiating from the edge of the half-plane. It is known that the streamlines and the wavefronts are mutually perpendicular, and again there is an analogous pattern in fluid mechanics called the flow network. In an unobstructed flow field, such as a plane wave, however, the streamlines are parallel to each other and perpendicular to the plane wavefronts, and the intensity distribution in time is smooth all across the field. Thus it can be stated that it is the bending of the streamlines around an obstacle which causes the distortion of the field, and the creation of the fixed pattern of intensity maxima. In FIG. 1 below, a plane wave with wavefronts (1) and streamlines (6) approaches an aperture of width (A) made centrally around the origin in a thin screen (2) in the (x,y) plane. The wavefronts are spaced a distance equal to the wavelength L, and at the aperture plane (a—a) the wavefront is plane. Some of the field is reflected (7) but the part transmitted through the aperture experiences the topographic distortion referred to above. The first diffracted wavefront after (a—a) becomes the elliptical wavefront (3). The streamlines bend by 90° near the aperture's edge, and gradually less so until the center of the aperture is reached where the streamline (6) coincides with the optic (z) axis. While the streamlines are normally invisible and the wavefronts of an optical field fluctuate with a frequency so rapid that it makes their detection in time almost impossible, the intensity maxima are fixed in place. Over time-average they can be detected, for example by placing a film and observing the typical diffraction pattern of maxima and minima. FIG. 2 below gives the wake pattern created by a fluid field flowing through a fixed gate. The creation of wakes is very common in nature and the wake of a boat moving in water has been analysed in *The American Journal of Physics* Vol.52, No.9, Sep. 1984, "Elementary derivation of the wake pattern of a boat" by F. Crawford pp.782–785. FIG. 2 shows how the energy of a flowing fluid follows the streamlines (arrows) to bend around the corners (a) of a fixed gate. Simultaneously a stationary wake pattern is formed, characterized by a stationary wave where the fluid concentrates in radial ray patterns.

Comparing FIG. 1 and FIG. 2 thus confirms the wake nature of the diffracted field. For a boat or airplane, the wake is V-shaped, but for an infinite obstacle only one side of the V pattern is observed, such as the maxima (4) or (5) in FIG. 1. If one imagines the obstacle travelling at the speed of light in an otherwise stationary field, one can say that diffraction is equivalent to a sonic shock wave wake pattern.

If this is the true physical situation, what about such 'explanations' of diffraction based on such concepts as Huygens-Fresnel wavelets spreading from every portion of the aperture? As Born and Wolf have observed (p.374) "The Huygens-Fresnel principle leads to the correct expression for the propagation of a spherical wave in free space. [It must be] however, regarded as a purely convenient way of interpreting the mathematical expressions, and as being devoid of any physical significance". In other words just because this principle works as an approximation (it fails seriously in the region of interest near the obstacle), one should not regard it as the correct physical cause of diffraction. It is probably this very mathematical success of a physically fictitious model that has distracted attention from the possibility of the cancellation diffraction. The same could be said of the concept of scattering radiation from the edge. Sommerfeld has shown that this is indeed another correct mathematical interpretation of diffraction, but as FIG. 11.14 of Born and Wolf shows (see FIG. 1 below) the energy is actually carried by the streamlines around an obstacle, and is not radiated from the edge.

In summary, we can say that the whole diffraction pattern is caused by the bending of the energy streamlines (6) of FIG. 1, around an obstacle. In fact the spreading out of these curved rays resembles the pattern of rays emerging from a negative (diverging) lens. In the case of such a lens, adding a positive lens of equal curvature will annul the diverging action, since the compound positive-negative lens will be a plate with no focusing action. In much the same way, the action of diffraction can be regarded as an kind of imaginary converging "diffraction lens". It seems logical to assume therefore, that adding some kind of positive lens to the diffracting aperture might correct the divergence of the streamlines. This is the intuitive basis for this invention, since in an unrestricted wave field, the streamlines are straight and no standing waves (maxima) occur.

Figure 3:
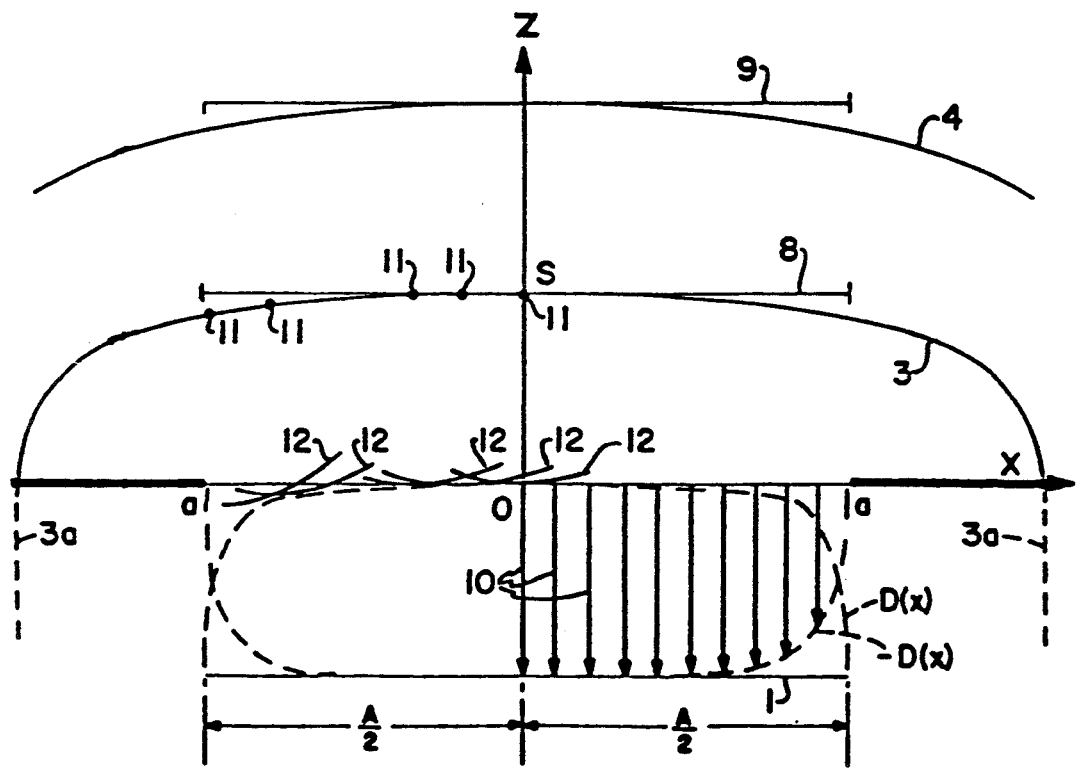
FIG. 3 is a diagram showing wavefronts near a diffracting aperture.

FIG. 3 shows a wavefront (1) just before it reaches the aperture (a—a). As soon as the field spreads out, however, the wavefront a—a expands into the elliptical wavefront (3) and thereafter continues to spread like ripples in a pond, into (4) and so on, carrying energy infinitely in all directions. Had there been no diffraction, (a—a) would simply continue as a truncated wave (8) parallel to the aperture plane, and continue to (9) and so on as a beam with no energy lost in the shadow regions. Similarly in the case of a spherical or any other wave, diffraction causes the wavefront at the aperture to spread out into the geometrical shadow regions. Returning to the case of the plane wave (1) impinging normally onto the aperture, we wish to determine the shape of an imaginary "diffraction wavefront" $D(x)$ which, in the absence of any obstacle, would create the diffracted wavefront (3).

Assuming heuristically that the field now optically reverses itself, and the direction of propagation of (3) is now towards the aperture plane, and also assuming that the screen (2) and hence any further diffraction effects are also absent, (3) will not become (a—a), but rather a wavefront $D(x)$ defined by the envelope of Huygens wavelets (12), centered on points such as (11), evenly distributed all along (3). This envelope might not fit precisely within the confines $x = \pm A/2$, and the curve will have to be corrected so that $D(x)$ does so, by extending (3) into the imaginary (3a) parallel to the z-axis. Again, using the principle of optical reversability, we can say that $D(x)$ is the wavefront that generates (3) in the absence of an obstacle. To dediffract (3), therefore, $D(x)$ must become a plane wave (1) by retarding it by $-D(x)$. Having in this manner obtained $D(x)$, we can now apply it to the actual diffracting screen (2) whereby any wavefront impinging on it must be retarded by $-D(x)$. For example, the wavefront (1) must experience an optical path length change indicated by sample arrows (10), thereby becoming biased against the diffraction distortion. After passing the aperture plane, it will reach the point (S) as a truncated wave (8), and, not encountering any obstacle thereafter, proceed to (9) and so on as an undiffracted beam without divergence.

In the case of a symmetrical aperture, (3) is generally elliptical, and it can be seen qualitatively that $D(x)$ will be a smooth curve symmetrical around the z-axis normal to the z-axis at the origin, and parallel to it a $x=\pm A/2$. $D(x)$ slowly assumes its curvature as it approaches a region away from (a), when it dips smoothly, forming a curved "corner". Finding the exact form of (3), and hence of $D(x)$ is best done by modelling the field's wavefronts in the region of the aperture, using standard rigorous optical formulae known in the art, such as those used by Sommerfeld as described in Born and Wolf's book mentioned above. Another method is to use any computer programs such as COOL GE-NIIPC (marketed by Genesec Computer Center Inc., 20 University Ave, Rochester, N.Y.) The actual form of (3) and hence $D(x)$ changes according to the boundary conditions, such as the obstacle's shape and dielectric properties. In such a rigorous simulation of the diffracted field's wavefronts, trial and error methods can be used to find the best phase-retardation function $D(x)$ at the aperture which will result in minimizing or cancelling altogether the diffraction effects for the given situation.

What is important to realize is that for every diffracting situation, an appropriate $D(x)$ can be found by any of the methods outlined above, which best rectifies the field and cancels out the diffraction distortion. In general any such $D(x)$ is characterized by a rapid phase change away from the diffracting edge. Conventional optical focusing methods can be used to affect the retardation $D(x)$ at the aperture. In practical terms the profile of a reflector must be changed by adding $D(x)$ to its original shape $F_R(x)$ so that the final profile will be the superresolving reflector $S(x)$:

$$S_R(x) = F_R(x) - \tfrac{1}{2}D(x) \quad (2)$$

The negative sign is because the field is reflected, and only $\tfrac{1}{2}(Dx)$ is needed since any change in a reflector's shape doubles the optical path length (through reflection) and hence the corresponding phase change. An antenna whose profile is a superparabola can focus the field to a sharp point image with a width L, i.e. super-resolution $R_S = L/2f$, f being the focal length of the instrument. The resulting gain G in resolution, from Eq. (1), will be:

$$G = R/R_S = 2.44 \, f/A \quad (3)$$

which can be considerable for antennas with a large focal length. In the cases of lenses, implementing the DD scheme of Eq. (4) means changing the profile of the lens by a function:

$$L(x) = D(x)/(n-1) \quad (4)$$

where n is the index of refraction of the lens, giving a superfocusing lens profile $S_L(x)$:

$$S_L(x) = F_L(x) + L(x) \quad (5)$$

As before, $F_L(x)$ is the original profile of the focusing lens. The preceding analysis is given in terms of one dimensional configurations. The functions $D(x)$, $S_L(x)$ and so on can be translated or rotated to give the cases for two dimensional rectangular or circular apertures in the plane (x,y). Note that Eq.(1) and Eq.(3) refer to circular apertures or or obstacles only. In the one dimensional case the multiplicant becomes 1 and 2 respectively, instead of 1.22 and 2.44. It is noted here that in any DD scheme, the phase retardation must be applied before the aperture plane is reached.

BEST MODE FOR CARRYING OUT INVENTION

This basic invention has many applications in instruments in several different fields such as optics, acoustics, beam physics, and so forth, whenever the phenomena of diffraction is encountered in wave fields. Thus, it will be impossible to describe each application individually in this one application, and only three embodiments will be detailed, without in any way limiting the invention to these particular applications.

In each of the cases only the crosssection in the (x,z) plane will be described. As mentioned above translation or rotation will give the corresponding figures for rectangular or circular apertures.

The first embodiment is the case of cancelling the diffracting effects from a reflector, such as a microwave antenna or a telescope mirror. Here DD can be carried out by applying Eq.(2), to a superfocused disc one L in diameter, with the gain in resolution given in Eq.(3).

Figure 4:
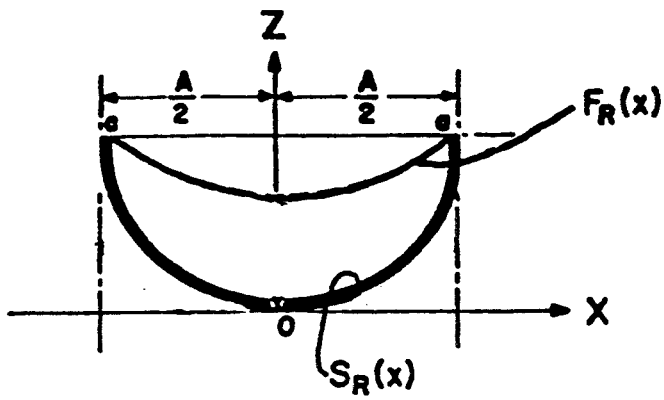
FIG. 4 is a diagram illustrating one type of super-parabolic reflector such as a telescope mirror or microwave antenna.

This is illustrated in FIG. 4, and it must be stressed that the procedure described in the previous section to find the exact value of $D(x)$ for each application should be followed. This remark concerning the nature of $D(x)$ also applies to each of the other cases described below. In general however, DD reflectors will not have flat rims substantially tangent to the curve near the edge, but will rather have a raised lip giving the reflector the shape of a pie crust.

Figure 5:
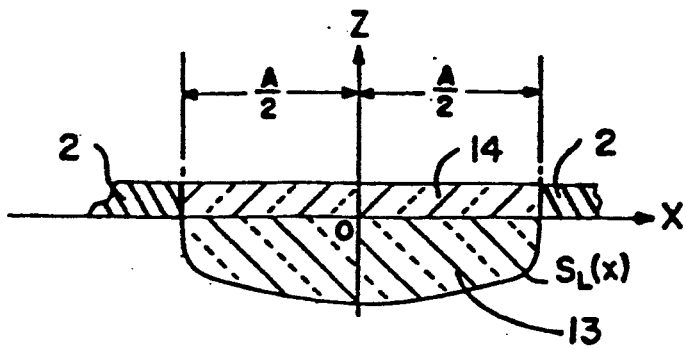
FIG. 5 is a vertical cross-section of a special de-diffractive lens element placed in an open aperture such as that of a laser.

The second embodiment applies to any open aperture or exit pupil which emits a field, such as the window of a laser. Such fields or unfocused beams spread out due to diffraction at an angle L/A for a beam of Gaussian diameter A. Far from the source, the beam loses concentration and directivity, so it is most desirable that nondiffracting beams such as DD beams be created. This can be accomplished by placing a phase-retarding DD lens in the output aperture of such beams, and the example of a laser output window will be described in this embodiment without limiting the applications to this particular case. Since there is no focusing intended over and above the DD 'focusing', the $F_L(x)$ term in Eq. (5) is zero, and $S_L(x) = L(x)$ as seen in FIG. 5, where a DD lens (13) is mounted in a screen (2) placed centrally in the output path of a laser or beam source. Said DD lens is supported by a plate (14) which can either be the original window of the beam or an additional plate with parallel sides, which in itself will have no effect on the phase of the field. Again care must be exercised to have the edges (a) of the aperture level with the plate (14), so that the phase retardation occurs before the streamlines have a chance to bend. Preferably, instead of two elements (13) and (14), another way to apply DD methods to a laser is to place a single graded index (GRIN) lens instead of the plate (14), without the DD lens (13). Such a GRIN lens will have a phase-retardation function of $D(x)$. Such a lens can be made by any of the methods known in the art, and have the physical form of a disc with parallel sides fitted within the nontransmitting screen. A laser fitted with any of the types of DD lenses described above should transmit its energy as a nondiffracting beam which substantially keeps its width A regardless of the distance from the source.

The third embodiment of this invention is the important case of a focusing lens such as a lens used in a camera or in binoculars or other optical instruments. There are three ways to apply DD methods to such lenses: First the planoconvex method where the plane side of the lens is placed flush within the holding screen (2) as in FIG. 5. However, the lens (13) in this case should have a profile $S_L(x)$ given by Eq. (5); where $F_L(x)$ is not zero but either a parabolic or spherical focusing function. In the spherical case, for example, $F_L(x)$ will have a radius of curvature of $f/(n-1)$ as is known in the art, added to which is $L(x)$ as measured parallel to the z-axis. In other words a single convex surface combines both the focusing and DD functions of the lens to face the incoming wavefront.

Figure 6:
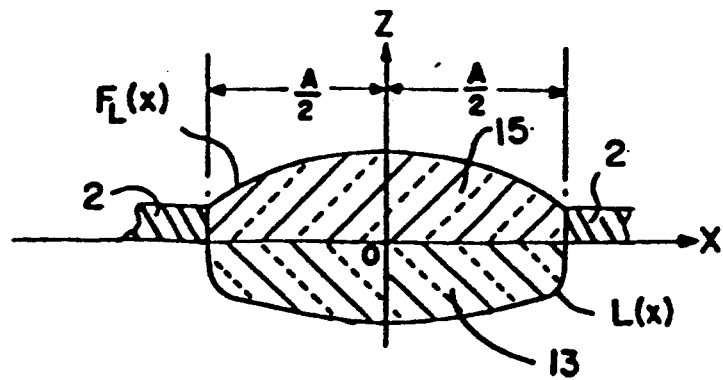
FIG. 6 is a vertical cross-section through another embodiment of the invention, with special de-diffractive lens element, used in conjunction with a conventional convex lens, such as that of a camera.

The second method of applying DD to a lens is when the lens is convex on both sides. The side facing the incoming wavefront is necessarily the DD lens (13) as in FIG. 6. The other side of the lens (15) is the standard focusing lens known in the art and has a profile of $F_L(x)$. The third and preferred method of making a DD lens, however, is the GRIN lens. As described above, the GRIN lens consists of a plate of parallel sides whose index of refraction varies with x so that the effective phase retardation function of the lens will be $S_G(x)$:

$$S_G(x) = F_G(x) + D(x) \qquad (6)$$

with $F_G(x)$ being the phase retardation function needed for normal focusing, for example $(x^2/4f)$ when a spherical focused wave is to be created. Again the way to manufacture such a GRIN lens is according to procedures known in the art.

In the case of compound lenses cemented together only the one surface of the assembly facing the incoming field need have a DD lens. But if several such separate lens assemblies are used in one instrument, each assembly should have its one external surface facing the wavefront corrected for DD. The same can be said for combinations of lenses and reflectors where each element should be independantly corrected for DD, much as individual lens elements are separately corrected for aberrations.

The above embodiments describe a general method to correct reflectors, lasers or lenses for the diffraction distortion, and it is noted that no mention has been made of the different optical or communications or other particular applications in which such DD elements can be used. For example by replacing a standard camera lens with a similar lens having a DD correction, the camera will be able to take much sharper pictures than the current "diffraction limits" would allow. A parabolic DD antenna would enable a radar system to obtain sharper images than one fitted with a similar antenna not corrected for diffraction. Such applications of DD elements are obvious and do not need to be listed in detail, just as, by analogy, the inventor of a new method to sharpen nails need not list all the different types of nails nor the separate possible applications in furniture making, house-building and so forth. In the same spirit, the DD methods outlined above can be applied to acoustic, electron, electromagnetic and any other wave field experiencing the effects of diffraction, and the $D(x)$ wave retardations required will be substantially the same for all these different waves travelling in different media and meeting various obstacles.

While according to patent statutes, preferred embodiments and best modes have been presented, the scope of the invention is measured by the scope of the attached claims.

What is claimed is:

1. A method to cancel or minimize diffraction effects for an optical or other electromagnetic wave-field emitted, transmitted or reflected by or from any device or instrument, where said wave-field suffers from diffraction effects due to its being limited by the size of an emitting, transmitting or reflecting device, pupil or aperture, hereafter to be referred to as the aperture, wherein the path length which an approaching wavefront of said wave-field needs to traverse in order to reach an aperture plane is altered, so that the same wavefront retains its original shape everywhere within said aperture, except in the region of an edge of said aperture, whereby the said wavefront is caused to have a raised and smoothly raised edge or lip continuous with and tangential to the said wavefront, and normal to said aperture plane at the outer edge of said lip, so that along any line segment(s) lying in said aperture plane and normal to and measured from the said aperture edge, the path alteration function $D(s)$ measured normal to said aperture plane, is zero at said aperture edge, and increases continuously and smoothly to form a rounded or curved corner, reaching a maximum value equal to or larger than a wavelength of said wave-field, where said corner joins with said original wavefront's profile, and retaining the said constant maximum value everywhere in the said aperture except at said curved corners, whereby the result of said alteration function $D(s)$ in said path length is to refocus the said wavefront so that said wave-field will leave said aperture in its geometrical or undiffracted form, thereby increasing the gain or directivity of the said field if it is an unfocused beam, or increasing the resolution beyond the diffraction limits, thereby achieving superresolution in the case of focused fields.

2. A method to cancel or minimize diffraction effects as in claim 1, wherein for a transmitting plate or lens irrespective of its shape or function, whether said plate is used singly or is part of a compound lens or lens assembly, such that the side of said plate or lens facing the approaching wavefront has affixed to it or placed parallel to it, or has forming an integral and continuous part of said side, a refracting plate of thickness $D(s)/(n-1)$ having smooth rounded edges or corners and extending so as to be equal to or smaller than said side, (n) being the said plate's index of refraction, so that said wavefront passing first through said refracting plate, will be transmitted through the original said plate or said lens, without suffering from the diffraction spread.

3. A method to cancel or minimize diffraction effects as in claim 1, wherein for a reflecting mirror or antenna, or in the case of an emitting antenna or wave source, hitherto to be referred to as the reflecting or emitting aperture, such that the necessary changes in path length $D(s)$ are accomplished by changing the physical profile of the said reflecting or emitting aperture, so as to give it a concave and raised edge with a profile $D(s)$ in the case of said emitting aperture, or $D(s)/2$ in the case of said reflecting aperture, giving the said mirror or antenna or said emitting source the shape of a tray retaining its original profile in the central portion, but having a curved and said raised edge normal to the said aperture plane at the outer edge.

4. A method to cancel or minimize diffraction effects for a wavefield as claimed in claim 1 wherein for a graded index or GRIN lens, such that the index of refraction of said lens is adjusted as the edge is approached, so that effective optical path length alteration D(s) is achieved.

5. A method to cancel or minimize diffraction effects as claimed in any of claims 2, 3 or 4, in the case when said transmitting plate, lens or lens assembly, mirror, antenna or GRIN lens, or an emitting aperture is used to transmit, reflect or emit a laser or other beam, so that said laser or beam's field will emerge without suffering from the spread of diffraction, increasing in gain or directivity.

* * * * *